United States Patent [19]

Sindoni

[11] 4,314,653
[45] Feb. 9, 1982

[54] MULTIPLE AUTOMATIC METERING DEVICE

[76] Inventor: Giuseppe Sindoni, Via Muratori 29, Milan, Italy

[21] Appl. No.: 98,030

[22] Filed: Nov. 28, 1979

[51] Int. Cl.³ .......................... G01F 11/14; B01F 3/00
[52] U.S. Cl. ...................................... 222/41; 222/137; 222/243; 366/137; 366/605
[58] Field of Search ............... 222/135, 137, 243, 256, 222/260, 266, 275, 276, 41, 42, 226, 246; 141/146, 147; 366/136, 137, 605

[56] References Cited

U.S. PATENT DOCUMENTS

| | | | |
|---|---|---|---|
| 2,787,402 | 4/1957 | Stiner et al. | 366/605 X |
| 2,848,019 | 8/1958 | Corbin et al. | 366/605 X |
| 2,923,438 | 2/1960 | Logan et al. | 366/605 X |
| 3,122,272 | 2/1964 | Marsh | 222/42 X |

FOREIGN PATENT DOCUMENTS 5018  7/1932  Australia ............................ 222/243

Primary Examiner—Robert J. Spar
Assistant Examiner—Edward M. Wacyra
Attorney, Agent, or Firm—McGlew and Tuttle

[57] ABSTRACT

A multiple automatic metering device particularly suitable for metering and admixing paints and able to meter exact quantities of various base colors so as to be able to obtain an extremely wide range of shades. The device comprises a series of units consisting of a container for the color and of a metering head connected therewith. The device can be programmed to assure the duplication of the metering operation and to insure uniformity of the color of various batches of final product.

10 Claims, 7 Drawing Figures

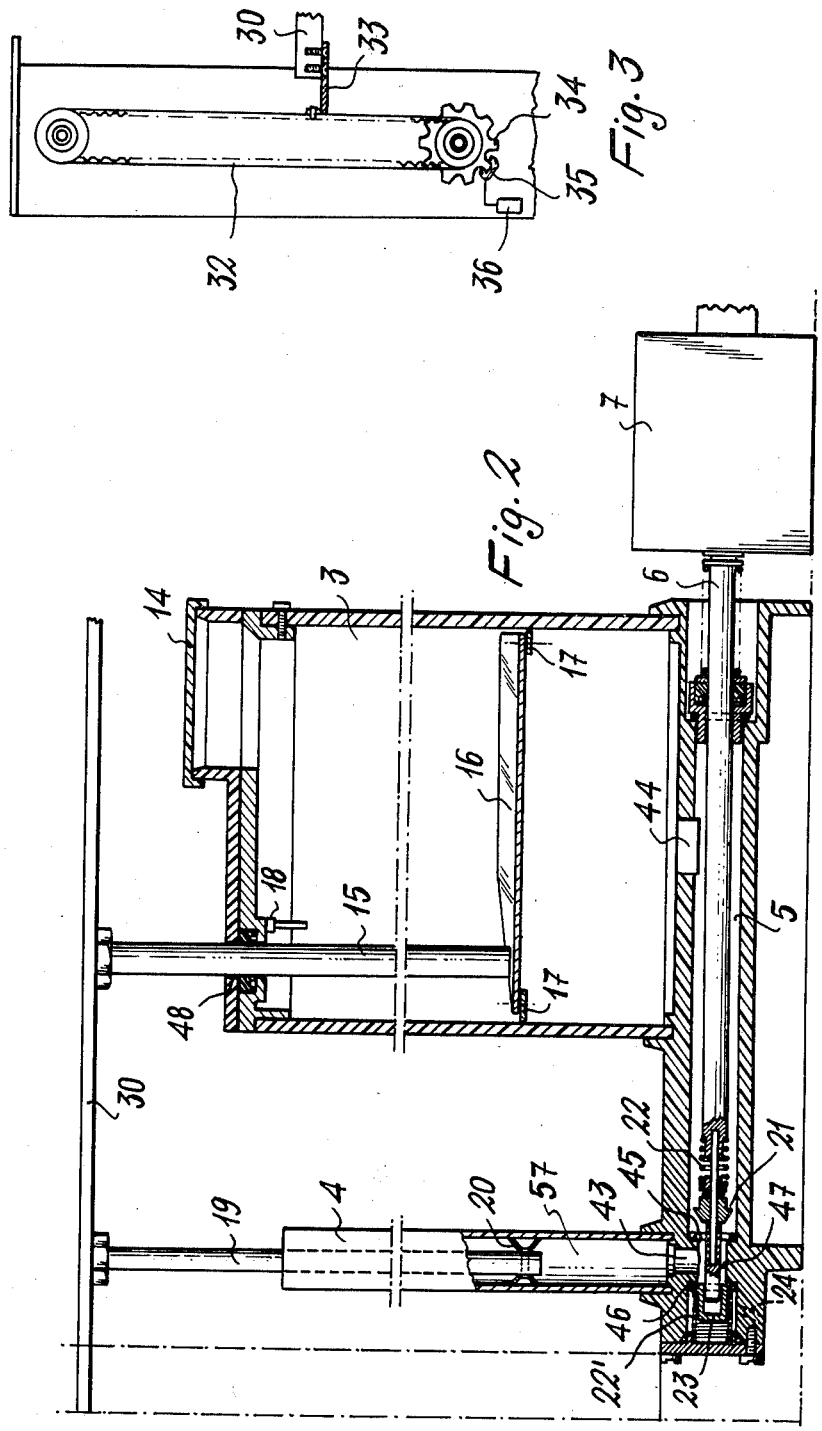

MULTIPLE AUTOMATIC METERING DEVICE

FIELD AND SUMMARY OF THE INVENTION

The present invention relates to a multiple automatic metering device particularly suitable for use in dye works or the like, which is able to produce a large number of different colors by metering out a limited number of base colors previously introduced in containers present in the device. The device is able to discharging the colors simultaneously in a final container where they become admixed with each other, forming a mixture of the desired final shade.

Means are provided in the device of the invention to admix the base colors, avoiding the decantation thereof, with control elements for all the operations of the machine. Means are also provided which permit the programming and memorization of various combinations of shades.

It is also provided that the control of all the functions of the metering device is by use of a computer which is capable also of providing an accounting of the machine by visually showing the data on a display panel provided on the front part of the machine.

According to the invention, each container has a metering head coupled thereto. Means are also provided for maintaining the product in continuous motion by making it flow from the container to the metering head and vice versa.

At the moment of discharge, a suitable device diverts the flow of the colored mass which exits from the metering head toward the final container. When the metering operation is completed, the same device causes the flow of that portion of the colored mass remaining in the metering head toward the container, as will be explained hereinafter in more detail.

There are presently known various types of metering devices, which are used in numerous fields, from the food industry to the chemical field. These metering devices, in addition to having a rather limited accuracy, present substantial inconveniences when they are to be utilized with volatile products, highly viscous products or products which present a high tendency to become dry. Such inconveniences are particularly present when the operation of the machine is not continuous. This is due both to the residues of product which, upon drying, obstruct the conduits preventing a subsequent exact dosage, and to the variations of the concentration of the content itself due to the partial evaporation of the same.

One feature of this prior art is that it is necessary to maintain the product in continuous motion in every part of the machine in order to prevent the formation of possible deposits. Another problem is the fact that the entire section in which the products circulate, must be completely sealed.

In addition, the device must permit an extremely accurate dosage, allowing one to obtain a duplication of the operations even after some time has elapsed, in order to obtain final products all of which have the same characteristics.

These problems have been solved by the present invention which uses a metering device in which each container is permanently connected to its own metering head by a cylinder or the like, through which the product, mixed and maintained in constant motion by appropriate means, is made to pass from the container to the metering head and then made to return along the same path if not utilized.

At the moment of discharge, a valve inserted in the cylinder which connects the metering head and the container, opens the discharge conduit, at the same time closing the passage from the metering head to the container, so that the product flows toward the discharge container.

Accordingly an object of the present invention is to provide a metering device which avoids the problems of the prior art metering devices and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The present invention will now be described in detail, by way of illustration, with particular reference to the attached drawings in which:

FIG. 2 is a sectional view of a metering head-container complex and the respective connecting chamber;

FIG. 3 shows a detail of the device for detecting the quantity of product discharged;

DESCRIPTION OF THE PREFERRED EMBODIMENT

Figure 1:
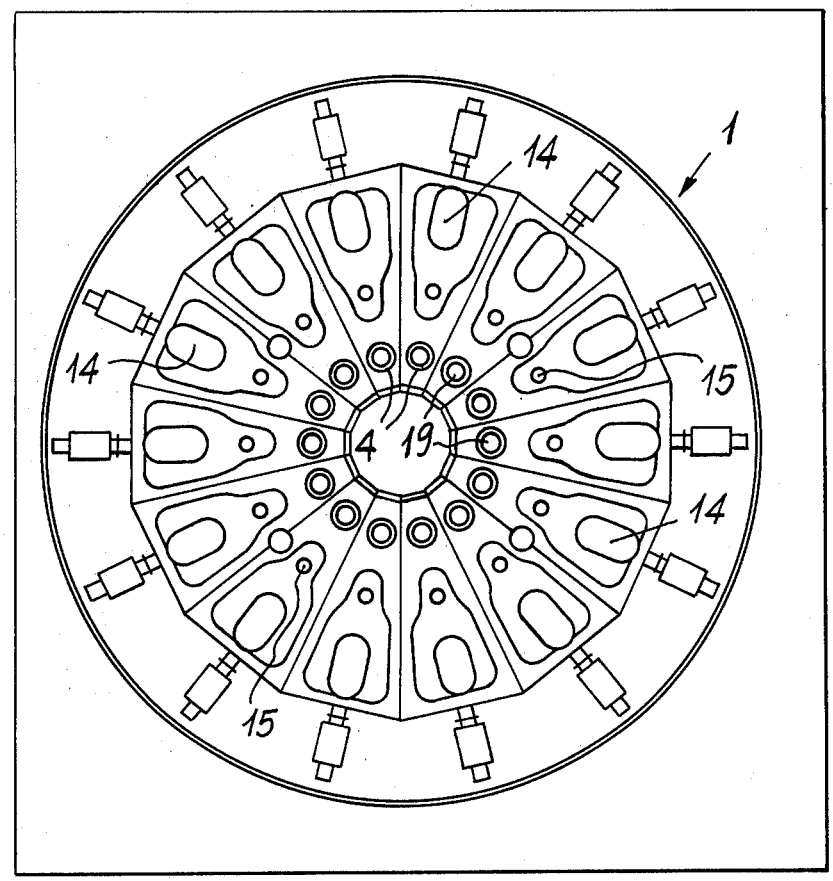
FIG. 1 is a plan view, from above, of the containers plus metering heads, complex.

A series of units, each of which comprises a container and a metering head, are disposed preferably in a radial arrangement, thus forming a drum-shaped body generally designated 1 in FIG. 1.

As seen in FIG. 2, each single unit comprises a container 3 which is closed at the upper end thereof by a hermetically sealing cover 14 and a metering head 4 connected to the container 3 by means of a chamber 5. Chamber 5 is preferably cylindrical in shape and located at the lower end of container 3. To the upper end of container 3 are affixed sensors 18, of a known type, for the control of the level of the coloring agent within container 3.

A stem or shaft 6 may slide inside chamber 5. Shaft 6 is moved or commanded by an electrovalve 7 or the like. At one end of shaft 6 are affixed gaskets 21 and 23 which are urged respectively by springs 22 and 22', according to the position of the shaft, to; respectively close the opening 45 and open the passage 46, or vice versa. The opening 45 connects the chamber 5 with a second chamber 47, of smaller dimensions, located below the metering head, which is in turn connected to chamber 57 in the head, through conduit 43.

The opening 46 connects the chamber 47 to the discharge conduit 24 directed toward a final container for receiving the agent.

Above the units, each formed of head 4 and container 3, a plate 30, supported by a central shaft (not shown in the drawings), slides vertically in a reciprocating motion. To the plate 30 are fixed the shafts 19, to each of which are affixed gaskets 20 which slide on the inside of the metering heads 4, and the shafts 15 which, through the sealed leakproof opening 48, extend into the containers 3.

Figure 6:
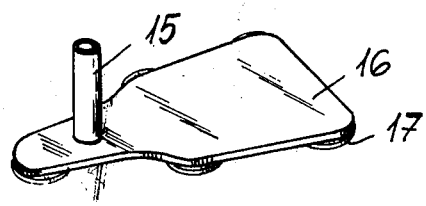
FIG. 6 is a prospective view of a blade present on the inside of the container.

At the end of each shaft 15 is located a blade 16 having a shape corresponding to and slightly smaller than the internal section of the container 3 (FIG. 6) tilted about its major axis and having a series of elastic elements 17, preferably of rubber, which slide along the walls of the container.

In addition the blade 30 (FIG. 3) is fixed at 33 to a belt 32, preferably toothed, or the like, which cause the rotation of a toothed wheel 34 the teeth of which act, by interposing themselves in the path of a beam of light directed toward them, on a photocell 35 or the like connected to an impulse counter 36 of a known type.

Figure 7:
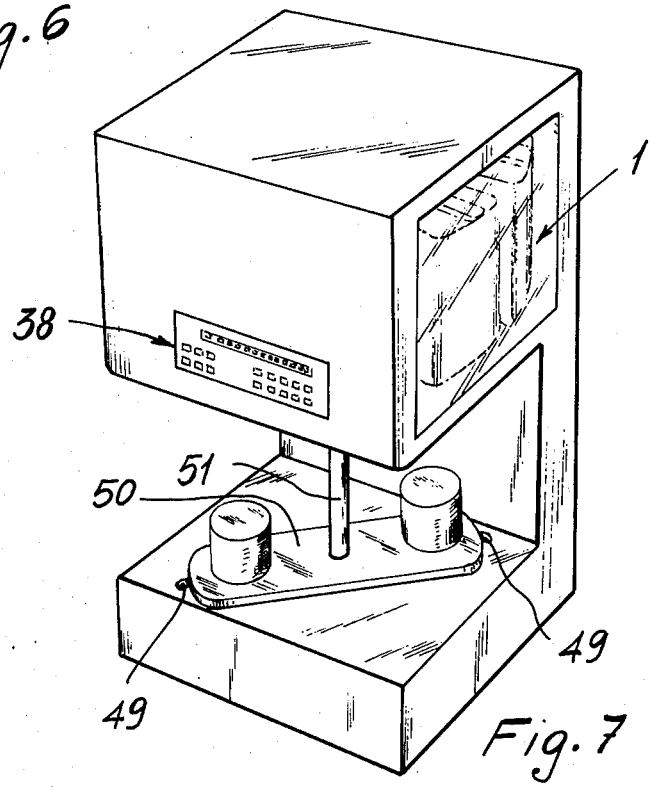
FIG. 7 is a prospective view, in its entirety of a metering device according to the invention.

Below the discharge orifices 24 a support pan 50 (FIG. 7) of final containers may rotate about an axis 51. At the end of said support are located the teeth 49 or the like which insert themselves in a stop, not indicated in the drawings, holding the pan in position when the final or discharge container is located below the orifices 24.

While the present application is directed essentially to the mechanical properties of the machine, there will now be supplied, purely by way of illustration, a summary description of an electronic circuit which may be suitably used to command the operation of the machine itself.

Figure 4:
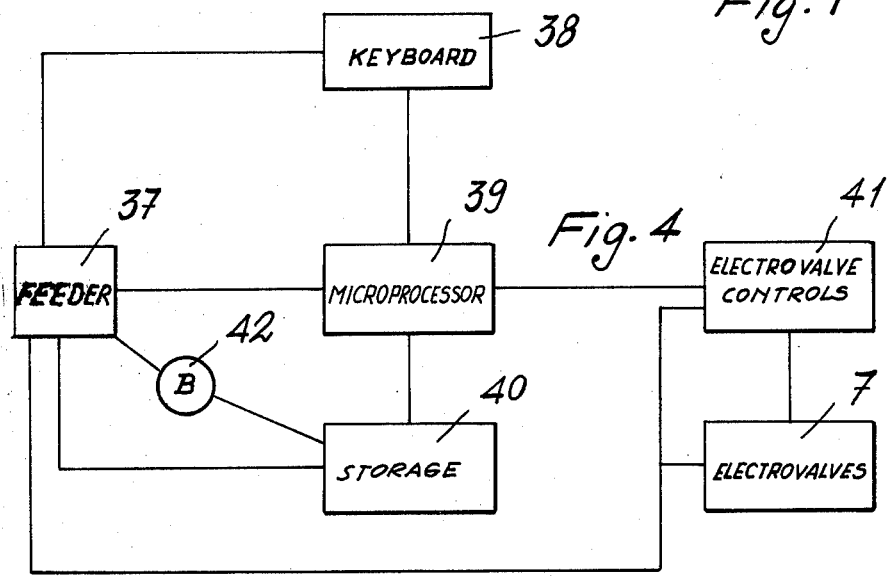
FIG. 4 shows a block diagram of the control circuits of the metering device.
Figure 5:
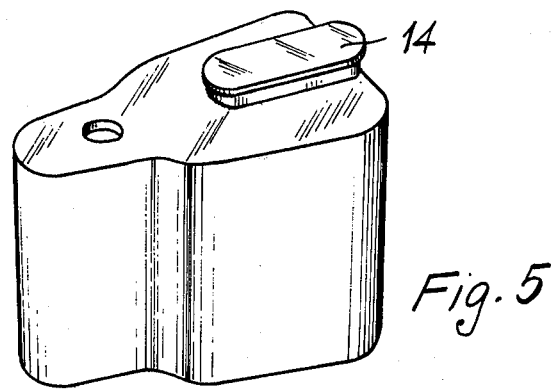
FIG. 5 is a prospective view of a single container.

A feeder of a known type 37 (FIG. 4) is connected to a push-button panel 38 which also comprises an indicator, to a microprocessor 39, to momory storage 40, to the electrovalve 7 and to the respective controls 41.

Between the feeder 37 and the storage 40 is inserted a battery 42 equipped with a device for connecting to the memory storage in case of interruption of the feed current.

The operation takes place as follows: when the device is to be started a motor is turned on and, through a hydraulic circuit or the like, the plate 30 moves. The stem 6 is in the position shown in FIG. 2 in which the opening 46 is closed while the passage between the chamber 5 and the metering head 4 is open.

The gasket 20, in its upward movement due to the motion of plate 30, sucks the coloring agent from the container 3 and then pushes it back into the container during its downward travel. In this manner, the colors present in the containers 3 are thoroughly admixed, both by means of the blades 16 and by the motion from the containers 3 to the respective metering heads 4 and vice versa. The elastic elements 17 fixed onto the blades 16 serve not only to guide the blades themselves but to remove the coloring agent from the walls of the container, thus permitting the visual control of the level from the outside.

At the end of the mixing operation, the microprocessor unblocks the other functions of the machine and it is now possible to set, on the push-button panel, the command corresponding to the preselected color shade. The combination of base colors, in the different quantities to furnish various shades, will have been previously memorized in the storage 40 which with battery 42 and the device which connects it immediately to the storage in case of interruption of the current, has the scope of maintaining the storage always active and, furnishing the necessary feed current.

Once the control is set corresponding to the desired color, the microprocessor determines the presence of the final container in correspondence with the discharge outlets 24 by means of photocells or the like, and detects the dimensions thereof and ascertains through the memory storage which of the containers 3 contains the desired base color in sufficient quantity. The discharge operation is then started.

When the plate 30 has reached the maximum height and the metering heads 4 are completely filled, the microprocessor activates the electrovalves 7 corresponding to the desired colors, pushing the stems 6 so as to close the passages 45 and open the paths 46 toward the discharges 24. Then the gaskets 20, during the downward movement of the plate 30 will discharge, simultaneously, the colors in the final container. The dosages will be controlled by the microprocessor by means of the device of FIG. 3.

In fact, the quantity of material discharged from each metering head is a function of the lowering of the plate 30, measured by means of the impulse counter 36, which counts the number of teeth which pass in front of the photocell 35. Since the toothed wheel 34 is driven by the belt 32 which is connected to the plate 30, it is clear that the passage of a tooth in front of the cell 35 corresponds to an exact lowering of the plate, lowering which causes the discharge of a determined quantity of color from the metering heads 4.

From the impulse counter 36 the signals are sent to the microprocessor which, as soon as a color has been discharged in the exact amount, activates the corresponding electrovalve, closing the passage 46 and opening the hole 45 so as to permit the back-flow into the container 3 of all the color remaining in the metering head and not discharged.

The amount of each color used is then memorized. The discharge from the various conduits takes place simultaneously and the electrovalves, commanded by the microprocessor, close automatically at the end of each single dosage.

The support plate 50 may be rotated so that it will not extend beyond the body of the machine during the transport and has a double-body configuration so as to permit, when one of the container is being filled, the positioning of the following one.

In addition, the microprocessor, other than for the control of the operation of the machine, may also be utilized for other uses. For example, the microprocessor can be used to cause the appearance, on the indicator of messages when the machine is not in use. It is also further possible to use the microprocessor as a calculator and in particular there is considered its use to keep the daily accounting of the machine.

One skilled in the art may foresee numerous modifications or variations which however must all be considered as falling within the ambit of the present invention.

What is claimed is:

1. A multiple automatic metering device particularly suitable for metering and admixing paints, wherein there are provided a series of units each of which comprises a container and a metering head connected between each other by a communication chamber having therein interception means displaceable into one of two positions and a discharge conduit toward a single central collecting container, in each container and in each metering head there being provided stems operated by a single plate capable of reciprocating movement, acting simultaneously on all units, said stems being connected to mixing blades for the containers and to sealing gaskets for the metering heads, so that for one position of said interception means there is a flow of the product to be dosed from the container to the metering head and vice versa under the action of the plate capable of reciprocating movement and that for the other position of interception the metering means discharge directly through the discharge conduit, there being obstructed the communication toward the container.

2. A multiple automatic metering device as claimed in claim 1, wherein each means of interception is operated by a single electrovalve commandable by a microprocessor, more electrovalves being operable simultaneously to determine the dosage from a plurality of units.

3. A multiple automatic metering device as claimed in claim 1, wherein the actuating plate is connected to a rotating interception organ of a counter so that the number of impulses generated by said counter is proportional to the degree of descent of the plate and thus to the quantity of substance introduced by the metering head into the discharge conduit.

4. A multiple automatic metering device as claimed in claim 1, wherein said means of interception located in the communication chamber between container and metering head consists essentially of a stem carrying, through elastic means, a first gasket of interception of a communication seat between said metering head and said container, said stem being engaged with its forward extremity on the inside of a blind-bottom sleeve having on the outside thereof a gasket apt to intercept the communication between metering head and discharge conduit, on said sleeve there acting a spring which tends to keep closed said communication, the means of interception being disposed so that the stem closes first the interception valve of the port of communication with the container and subsequently acts in opposition to the said spring for the opening toward the discharge conduit.

5. A metering device for metering liquids comprising:
   at least one liquid container for holding a supply of liquid;
   a mixing blade movably mounted in said container, extending across said container and spaced from interior walls of said container;
   a blade shaft connected to said mixing blade and extending out of said container;
   a metering head having a metering space communicating with said container;
   a head shaft slidable in said metering space for changing the volume of said metering space;
   a common plate connected to said head and blade shafts for simultaneously moving said head shaft in said metering space to draw liquid into and discharge liquid from said metering space, and said blade shaft in said container to move said mixing blade and mix liquid in said container; and
   valve means connected between said container and said metering head having a first position opening communication between said metering space and said container, and a second position for closing communication between said metering space and said container and opening communication between said metering space and a discharge outlet for discharging liquid from said metering space with movement of said head shaft to decrease the volume of said metering space.

6. A metering device according to claim 5, including elastic wiper elements connected to said mixing blade and extending to and contacting at least one container interior wall for wiping said at least one container interior walls as said mixing blade moves in said container.

7. A metering device according to claim 5, wherein said metering head comprises a cylinder, said head shaft having a gasket contacting an interior wall of said metering head cylinder.

8. A metering device according to claim 5, wherein said mixing blade has a shape conformant to but smaller than a cross sectional shape of said container.

9. A metering device according to claim 5, wherein said valve means comprises, means defining a chamber between said container and said metering space, a first valve seat in said chamber between said metering space and said container, a second valve seat in said chamber communicating with said metering space, a valve shaft movable in said chamber, and a pair of spaced apart gaskets connected to said valve shaft engageable respectively with one of said seats at a time, said chamber including said outlet opening, said second valve seat positioned between said metering space and said outlet.

10. A metering device according to claim 9, including an electrovalve connected to said valve shaft for moving said valve shaft.

* * * * *